United States Patent
Peterseil et al.

(10) Patent No.: US 9,869,980 B2
(45) Date of Patent: Jan. 16, 2018

(54) DEVICE FOR CONTROLLING A WORKING MACHINE

(71) Applicant: WACKER NEUSON LINZ GMBH, Hörsching (AT)

(72) Inventors: Johannes Peterseil, Katsdorf (AT); Helmut Kreilmeier, Alkoven (AT); Thomas Erlinger, Herzogsdorf (AT)

(73) Assignee: Wacker Neuson Linz GmbH, Horsching (AT)

( * ) Notice: Subject to any disclaimer, the term of this patent is extended or adjusted under 35 U.S.C. 154(b) by 685 days.

(21) Appl. No.: 14/397,298

(22) PCT Filed: Apr. 16, 2013

(86) PCT No.: PCT/AT2013/050090
§ 371 (c)(1),
(2) Date: Oct. 27, 2014

(87) PCT Pub. No.: WO2013/159134
PCT Pub. Date: Oct. 31, 2013

(65) Prior Publication Data
US 2015/0088276 A1   Mar. 26, 2015

(30) Foreign Application Priority Data

Apr. 26, 2012 (AT) .................................. 50149/2012

(51) Int. Cl.
*G05B 15/02* (2006.01)
*E02F 9/20* (2006.01)

(52) U.S. Cl.
CPC ............ *G05B 15/02* (2013.01); *E02F 9/2004* (2013.01)

(58) Field of Classification Search
CPC .............................. G05B 15/02; E02F 9/2004
USPC ...................................................... 74/490.15
See application file for complete search history.

(56) References Cited

U.S. PATENT DOCUMENTS

| 2,193,218 | A | * | 3/1940 | Best | F16H 61/36 |
| | | | | | 192/114 R |
| 4,134,560 | A | * | 1/1979 | Messerschmidt | B64C 27/58 |
| | | | | | 244/17.25 |
| 4,524,635 | A | * | 6/1985 | Hulin | F16H 61/18 |
| | | | | | 74/473.22 |
| 4,612,829 | A | * | 9/1986 | Fukaya | E02F 9/2004 |
| | | | | | 477/113 |

(Continued)

FOREIGN PATENT DOCUMENTS

| JP | S6150160 U | 4/1986 |
| JP | S61180255 U | 11/1986 |

(Continued)

*Primary Examiner* — David M Fenstermacher
(74) *Attorney, Agent, or Firm* — Boyle Fredrickson, S.C.

(57) ABSTRACT

A device for controlling a working machine has at least two control levers which are each operatively connected to at least one control device via an actuation unit. The actuation unit comprises a switching device with which the assignment between control levers and control devices is interchangeable. The switching device comprises at least four levers, of which every two levers are assigned to a control lever. Each of the four levers has a stop point for an actuation element. Each actuation element engages on the stop point with the respective assigned lever via couplings that can be detached without tools.

6 Claims, 3 Drawing Sheets

(56) References Cited

U.S. PATENT DOCUMENTS

| | | | | |
|---|---|---|---|---|
| 4,619,152 | A | * | 10/1986 | Suzuki ................... F16H 61/36 74/473.15 |
| 4,646,778 | A | * | 3/1987 | Tsuji ..................... E02F 9/2004 137/270 |
| 4,736,647 | A | * | 4/1988 | Shimoie ................ E02F 9/2004 137/635 |
| 5,097,628 | A | | 3/1992 | Kobayashi |
| 5,138,756 | A | * | 8/1992 | Johnson ................ E02F 9/2004 137/289 |
| 5,232,057 | A | * | 8/1993 | Renard ................. E02F 9/2004 137/636.2 |
| 5,427,336 | A | * | 6/1995 | Haggerty ................ B64C 13/12 244/229 |
| 5,924,516 | A | * | 7/1999 | Sagaser ................ E02F 9/2004 137/625.65 |
| 6,499,205 | B1 | | 12/2002 | Laffan |
| 7,458,432 | B2 | * | 12/2008 | Mayer .................... A01D 34/68 180/6.32 |
| 2008/0047383 | A1 | | 2/2008 | Walchester |

FOREIGN PATENT DOCUMENTS

| | | |
|---|---|---|
| JP | S62146221 U | 9/1987 |
| JP | H0681371 A | 3/1994 |

* cited by examiner

DEVICE FOR CONTROLLING A WORKING MACHINE

BACKGROUND OF THE INVENTION

1. Field of the Invention

The present invention relates to a device for controlling a working machine having at least two control levers that are each operatively connected, via an actuation unit, to at least one respective control device, the actuation unit including a switching device with which the assignment between control levers and control devices can be interchanged, the switching device having at least four levers, of which two levers are respectively assigned to a control lever, and of these two levers each assigned to a control lever one is immediately connected to a control device assigned thereto via a first pendulum support, and each lever connected immediately to the control device is capable of being pivoted synchronously with the lever that is connected indirectly to the control device and that is assigned to the other control lever.

2. Discussion of the Related Art

Such switching devices are optionally available in various countries for various working machines. Essentially, this means that for example the function "raise or lower lifter arm" of a mechanical shovel can be interchanged with the function "raise or lower bucket arm." This is required in particular in order to be able to adapt the controlling of a machine to the habits of an operator. After a switchover, the bucket arm, previously actuated using the left control lever, can then be actuated using the right control lever. A switchover of the function "raise lifter arm and lower lifter arm" takes place in the same manner, from the right control lever to the left control lever. A device of the type described above is known for example from JP 6-081371 A; in this device, the interchanging of the assignment between control levers and control devices takes place through the attachment of different brackets. If the brackets are attached properly, then the respective lever connected immediately to the control device is synchronously pivotable with the lever that is not connected immediately to the control device and that is assigned to the other control lever. A similar device is also known from JP 61-072137 A.

However, in the known devices having mechanical pre-controlling, a switchover is always associated with significant outlay, because a special tool is required for this purpose, resulting in significant outlay of work and time. Currently, a switchover not requiring tools is possible only in devices having hydraulic pre-controlling, through a switchover via a valve. Such devices having hydraulic pre-controlling are however not the subject matter of the present invention.

SUMMARY OF THE INVENTION

Based on the above existing art, the present invention is based on the object of creating a device having a mechanical pre-controlling of the type depicted above that permits a design with low constructive outlay, and with which a fast, uncomplicated, and secure switchover of the control lever functions in the desired manner is possible.

The present invention achieves this object in that each of the four levers has an attachment point for an actuating element, the actuating element engaging at its other end on the control lever, and engaging at the attachment point on the respectively assigned lever via couplings that can be detached without the use of tools.

According to the present invention, the switching device has four levers, of which each two are assigned to a control lever. Two levers are thus assigned as a pair to a control lever, and are operatively connected thereto in alternating fashion. Here, the control lever optionally engages the one or the other lever, and actuates it, using suitable means such as push rods, cables, or the like. A pivoting of the control lever thus results in a pivoting of the respective lever operatively connected to the control lever. Of these two levers assigned in pairs to a control device, one is operatively connected to the assigned control device. For this purpose, this lever is fashioned as a one-armed or multi-armed lever, and engages for example a pendulum support, i.e. a push rod or the like, on the control device, or if warranted can also engage the control device directly. The control device can be fashioned electrically, hydraulically, or in any other way. In order to make it possible to achieve the desired goal of a simple switchover, the lever of each lever pair that is operatively connected to the control device can be pivoted synchronously with the lever of the other lever pair that is not operatively connected to the control device. In this way, it is possible to connect the control levers directly to the lever operatively connected to the control device, or via the lever, of the lever pair assigned thereto, that is not operatively connected to the control device, the lever not having the operative connection then actuating, via the synchronous pivoting, the control device assigned to the other control lever. In this way, for the switchover it is necessary only to interchange or convert the operative connection between the control levers and the lever pairs assigned to them. For the switchover of the functions "raise/lower lifter arm" and "raise/lower bucket arm," no tool is required, due to the provision of the couplings that can be actuated without the use of a tool.

An advantageous operative connection between levers and control levers results if each of the four levers has an attachment point for an actuating element that engages on the control lever at the other end. This actuating element of each control lever is preferably in each case a second pendulum support that engages on the respective lever via couplings, in particular ball couplings. In this context, pendulum supports are any constructive elements that transmit arbitrary tensile and pressure forces.

Here, particularly simple design features result if the four or more levers are situated on a common axis of rotation and are capable of being pivoted about this axis. This axis of rotation can also be constructively fashioned as a single axle. If necessary, this axle can however also be interrupted in the axial direction. For simple and safe functioning, it is merely advantageous if the axes of rotation of the levers are configured coaxially to one another.

Simple and secure switching conditions result if, for the pivoting of the levers, a linkage, in particular a bracket, is provided that connects the levers that are to be pivoted synchronously to one another. In each case, this bracket connects the lever of the one lever pair that is operatively connected to the control device to the lever of the other lever pair that does not have an operative connection to the control device. Here, the bracket rotates with the lever about the axis of rotation and if warranted can act as a linkage point for the control device and/or for the respective control lever. The synchronous guiding of the respectively assigned lever can however also take place in any other manner, for example via shafts arranged coaxially one inside the other or the like.

Additional levers can be further provided on the common axis of rotation in order to realize further working functions of the working machine. This provides a significant cost advantage, because additional functions can be represented on one and the same axis. For example, these can include the functions "raise/lower lifter arm," "raise/lower bucket arm," "rotate bucket out/in," "direction of rotation left/right," "raise/lower blade," as well as the switchover according to the present invention, all of which features can be realized, via the present invention, on one axis as needed.

It is desirable if the couplings assigned to the levers have a socket that accommodates a ball assigned to each attachment point, the socket having an adjustment mechanism that alternately releases and locks the ball in the socket, the mechanism being capable of being actuated against the force of a spring. Thus, for example a socket of the pendulum support that accommodates a ball assigned to the attachment point can be provided with an adjustment mechanism that alternately releases the ball or locks it in the socket, the mechanism being capable of being actuated against the force of a spring and alternately releasing or locking the receptacle for the ball.

BRIEF DESCRIPTION OF THE DRAWINGS

In the drawing, the present invention is shown schematically on the basis of an exemplary embodiment.

DETAILED DESCRIPTION

Figure 1:
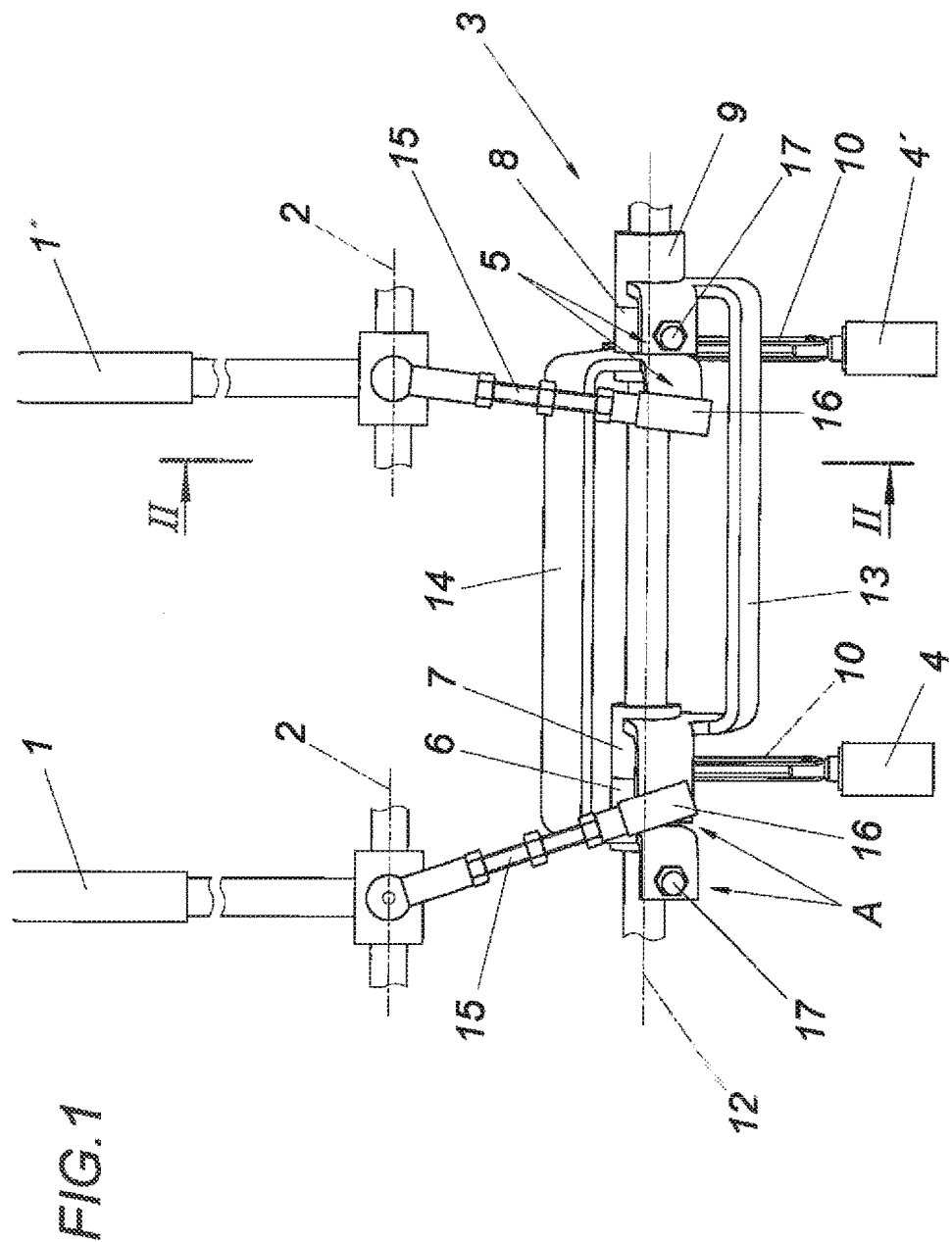
FIG. 1 shows a device according to the present invention in a front view.
Figure 2:
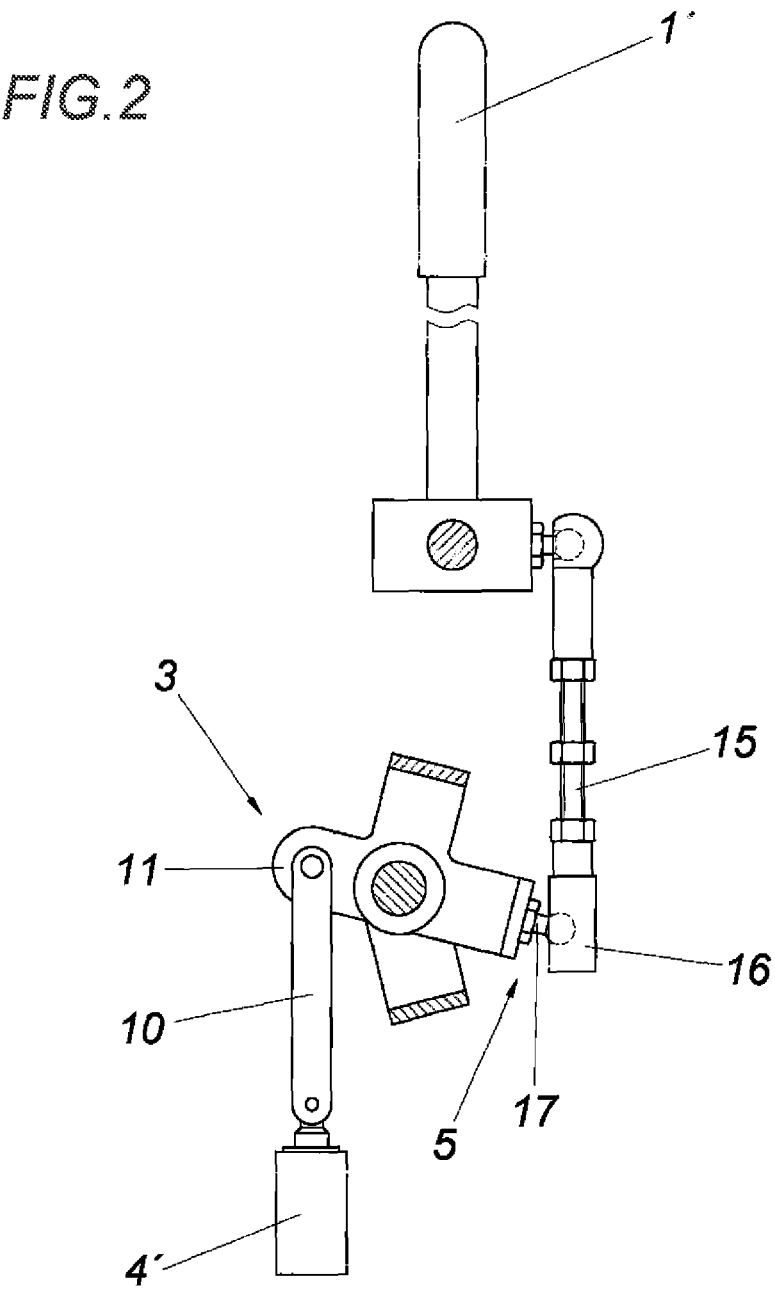
FIG. 2 shows the device of FIG. 1 in a section along the line II-II.
Figure 3:
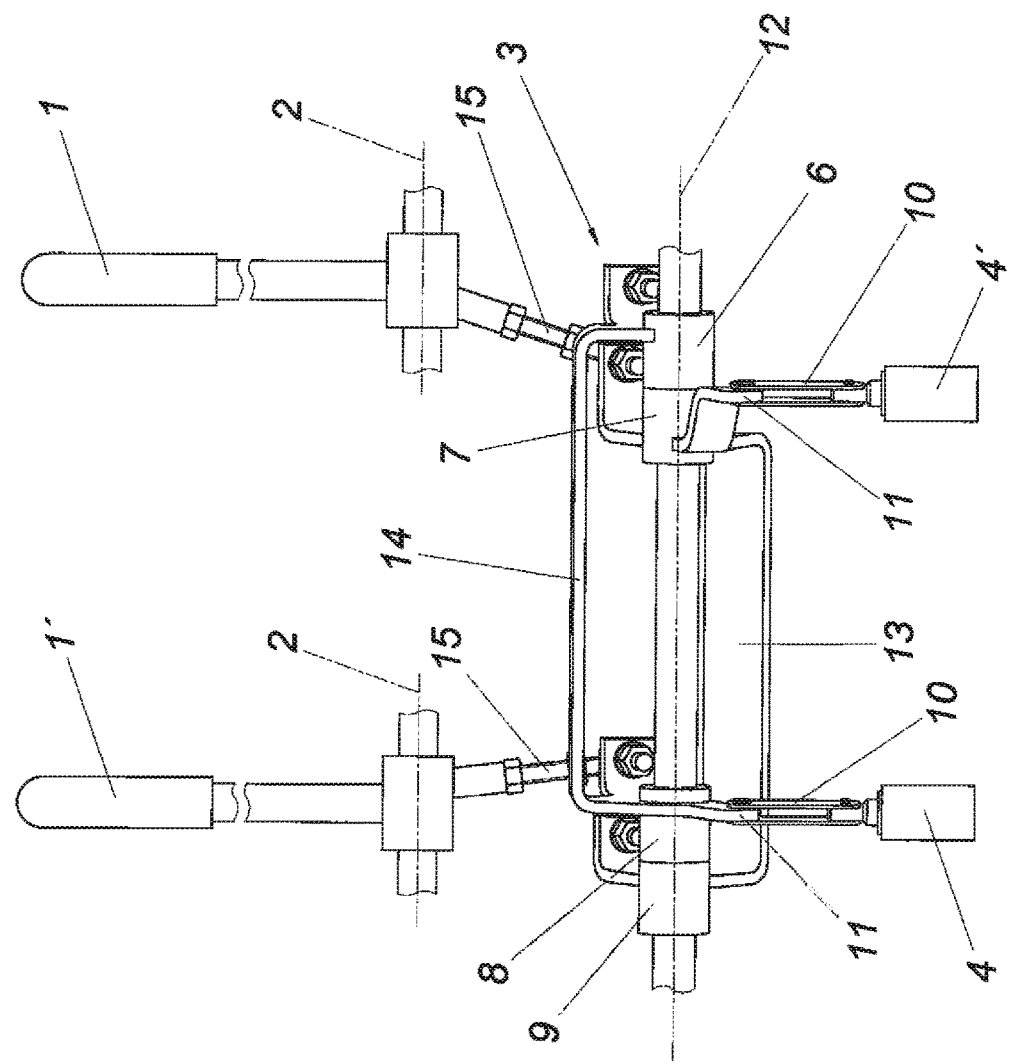
FIG. 3 shows a rear view of the device of FIG. 1.

A device according to the present invention for controlling a working machine not shown in more detail, in particular a power shovel or the like, has at least two control levers 1, 1', that are pivotable about an axis 2 and that are operatively connected to a respective control device 4, 4' via an actuating unit 3. This actuating unit 3 has a switching device 5 with which the operative connections between control levers 1 and control devices 4, 4' can be switched over. Control devices 4, 4' can thus alternately be actuated using the one or the other control lever 1, 1'.

For this purpose, switching device 5 has four levers 6, 7, 8, 9, of which two levers 6, 7 or 8, 9 are respectively assigned in pairs to a control lever 1, 1'. Of these two levers 6, 8 or 7, 9, assigned in pairs to a respective control device 4, 4', one is operatively connected directly to a control device. In the depicted exemplary embodiment, on the one side lever 7 is operatively connected, via pendulum support 10, to control device 4, 4', and on the other side lever 8 is so connected. For this purpose, levers 7, 8 have on their rear side projections 11 at which pendulum supports 10 engage. Here, lever 7, 8, directly operatively connected to respective control device 4, 4', is always synchronously pivotable with lever 6, 9, having no operative connection to the control device, of the other control lever 1, 1'. For this purpose, the four levers 6, 7, 8, 9 are situated on a common axis of rotation 12 and are capable of being pivoted about this axis. For the synchronous pivoting of levers 7 and 9, and of levers 6 and 8, brackets 13, 14 are provided that each connect a lever 7, 8, having an operative connection to the control device, of the one lever pair to lever 6, 9, not having an operative connection to the control device, of the other lever pair. Thus, levers 6, 9, having no operative connection to the control device, actuate, when required, levers 7, 8, operatively connected to the control device, of the other lever pair, via the respective bracket 13 or 14, i.e. in practice indirectly, and in this way actuate control device 4 assigned to the respective other lever pair.

Each of the four levers 6, 7, 8, 9 has an attachment point A for an actuating element engaging at the other end of control lever 1, 1', in particular a pendulum support 15 that transmits tensile and pressure forces. Pendulum support 15 engages control levers 1, 1' at one end, and at the other end engages levers 6, 7, 8, 9. For this purpose, in the exemplary embodiment couplings 16 assigned to the levers are fashioned as fast couplings that can be actuated with one hand, which can be placed between ball heads 17 forming attachment points A.

We claim:

1. A device for controlling a working machine comprising:
   first and second control levers that are each operatively connected, via an actuation unit, to at least one respective control device, the actuation unit including a switching device with which the assignment between the control levers and the control devices can be interchanged, the switching device having at least four levers, of which two levers are assigned to each control lever, and each of the two levers that is assigned to each associated control lever is immediately connected, via a first pendulum support, to the associated control device, and wherein each of the levers that is assigned to one of the associated control levers and that is immediately connected to one of the control devices is capable of being pivoted synchronously with another of the levers that is connected indirectly to the control device that is assigned to the other of the first and second control levers,
   wherein each of the two levers that is assigned to each of the first and second control levers has an attachment point for engaging a first end of an actuating element assigned to the respective one of the first and second control levers, each said actuating element engaging at a second end thereof on the associated control lever, and wherein the first end of each of the actuating elements engages the attachment point on the respectively assigned lever via couplings that can be detached without the use of a tool.

2. The device as recited in claim 1, wherein, for the synchronous pivoting of the levers, a respective bracket connects the levers that are to be pivoted synchronously with one another.

3. The device as recited in claim 1, wherein the four levers are situated on a common axis of rotation and are capable of being pivoted about the common axis of rotation, additional levers being provided on the common axis of rotation for the realization of further working functions of the working machine.

4. The device as recited in claim 1, wherein the actuating element of each control lever is in each case a second pendulum support that engages on the respective lever via at least one ball coupling.

5. The device as recited in claim 4, wherein each of the ball couplings has a socket that accommodates a ball assigned to a respective attachment point, the socket having an adjustment mechanism that alternately releases the ball and locks the ball in the socket, the mechanism being capable of being actuated against the force of a spring.

6. A device for controlling a working machine comprising:
   first and second control levers;
   first and second control devices;

an actuating unit that connects the first and second control levers to the first and second control devices, the actuation unit including a switching device switchable between 1) a first state in which the first control lever is connected to the first control device and the second control lever is connected to the second control device and 2) a second state in which the first control lever is connected to the second control device and the second control lever is connected to the first control device, the switching device having first and second levers assigned to the first control lever and third and fourth levers assigned to the second control lever, wherein the first and second levers are immediately connected to the first control device by a first pendulum support and the third and fourth levers are immediately connected to the second control device by a second pendulum support, wherein each of the first and second levers is capable of being pivoted synchronously with at least one of the third and fourth levers, and further comprising 1) a first actuating element having a first end that is connected to the first control lever and a second end that is associated with the first and second levers and 2) a second actuating element having a first end that is connected to the second control lever and a second end that is associated with the third and fourth levers, and wherein each of the first, second, third, and fourth levers has an attachment point that engages the second end of the associated actuating element via at least one coupling that can be detached without the use of a tool.

* * * * *